(Model.)

F. SWEETLAND.
LINK HOLDER.

No. 263,624.          Patented Aug. 29, 1882.

WITNESSES:
Chas. Nida.
C. Sedgwick

INVENTOR:
F. Sweetland
BY Munn & Co.
ATTORNEYS.

UNITED STATES PATENT OFFICE.

FRANK SWEETLAND, OF EDWARDSBURG, MICHIGAN.

LINK-HOLDER.

SPECIFICATION forming part of Letters Patent No. 263,624, dated August 29, 1882.

Application filed June 13, 1882. (Model.)

*To all whom it may concern:*

Be it known that I, FRANK SWEETLAND, of Edwardsburg, in the county of Cass and State of Michigan, have invented a new and Improved Link-Holder, of which the following is a full, clear, and exact description.

The object of my invention is to provide a new and improved device for holding links to guide them into the draw-heads in such a manner that the hands of the operator will not be in danger of being crushed.

The invention consists in a plate provided with an aperture and an ordinary coupling-link, with its side bars brought together at about the center and held in the aperture of said plate at said point, substantially as hereinafter more fully set forth.

The invention also consists in the method of receiving or holding this link in the plate, which consists in pressing the shanks or sides at one end or part of the link together, passing the link through the aperture in the plate, and then separating the shanks or sides that have been pressed together, whereby a loop will be formed at the side of each surface of the plate.

Reference is to be had to the accompanying drawings, forming part of this specification, in which similar letters of reference indicate corresponding parts in all the figures.

Figure 1:
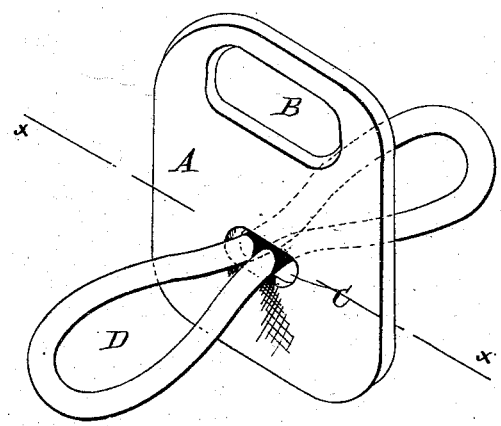
Figure 2:
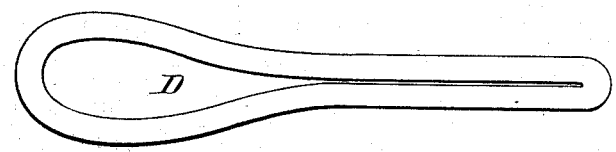
Figure 3:
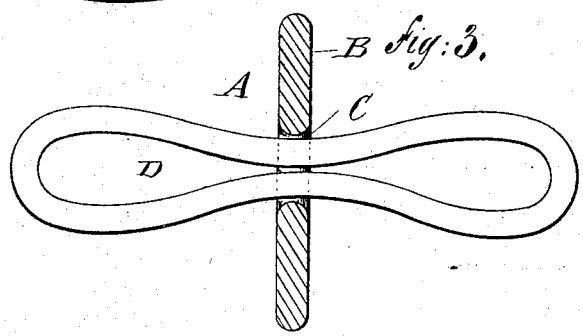

Figure 1 is a perspective view of my improved link-holder and the link therein. Fig. 2 is a longitudinal view of the link, showing it pressed together at one end to permit passing it through the link-holding plate. Fig. 3 is a horizontal sectional elevation of the improvement on the line $x\,x$, Fig. 1.

A metal plate, A, is provided with a handle aperture or slot, B, and below the same with an aperture, C, into which the link D is passed. To pass the link into the aperture C the sides or shanks of the link are pressed together throughout about one-half the length of the link. The end of the link that has been pressed together is then passed into the aperture C, and the sides or shanks of the link are then separated by means of a wedge, or in any other suitable manner, so that a loop will be formed at the side of each surface of the plate A. The link will be held loosely in the plate A, so that it can swing up or down or sidewise; but it cannot be removed unless the shanks or sides of the link are pressed together again. The link is thus held in the plate A without the use of keys or other locking devices. By means of the plate A the link can be raised and moved sidewise and guided into the draw-heads. The operator's hands will always be above the draw-heads and cannot be crushed between the ends of the draw-heads when they come together.

Having thus fully described my invention, I claim as new and desire to secure by Letters Patent—

The combination, with the plate A, adapted to be manipulated by the hand, and having the aperture C, of the ordinary coupling-link, D, having its side bars brought together about at the center and held thereat in the said aperture of the plate A, substantially as shown and described.

FRANK SWEETLAND.

Witnesses:
WM. W. SWEETLAND,
L. L. HORTON.